(No Model.)
E. E. HENDRICK.
COUPLING FOR JOINING PIPES.
No. 365,068. Patented June 21, 1887.
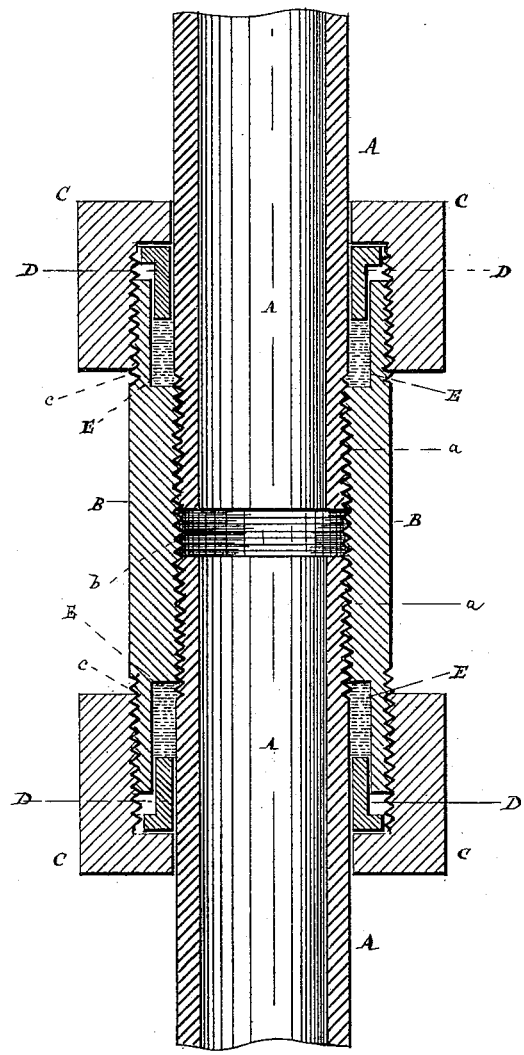
WITNESSES,
INVENTOR,

UNITED STATES PATENT OFFICE.

ELI E. HENDRICK, OF CARBONDALE, PENNSYLVANIA.

COUPLING FOR JOINING PIPES.

SPECIFICATION forming part of Letters Patent No. 365,068, dated June 21, 1887.

Application filed October 20, 1885. Serial No. 180,389. (No model.)

*To all whom it may concern:*

Be it known that I, ELI E. HENDRICK, of Carbondale, Lackawanna county, State of Pennsylvania, have invented a certain new and useful Improvement in Couplings for Joining Pipes, of which the following is a full and complete specification, reference being had to the accompanying drawings, forming a part thereof.

The object of my invention is to provide a coupling that will be strong enough to enable pipes connected by it to be run for long distances without support, to resist very high internal pressure, and avoid leakage at the joints under this high pressure, and under the action of any corrosive liquid or gas that is not capable of destroying the pipes it is used to connect, and finally able to resist the effects of both corrosion and pressure. To this end I use a sleeve, into which the pipes are screwed and upon which annular caps are screwed at each end, pressing an annular gland firmly against a packing of lead or soft metal or other suitable material, which in turn is forced against the outside of the pipes connected.

The device consists of a cylindrical sleeve provided with threads at each end externally, and with internal threads in the central portion. The ends of this sleeve are reamed out so as to have an internal diameter greater than the external diameter of the pipe and leave a space for packing and a gland. The caps are annular, of an internal diameter equal to the external diameter of the sleeve, and threaded inside. The glands are annular, flanged at one end. The pipes are threaded at the end in the usual way.

In the drawing, which is a longitudinal axial section of two pipes connected by my improved coupling, A are the pipes; B, the sleeve having the internal threads, *b b*, corresponding with like threads, *a a*, on the ends of the pipes; C C, the caps having internal threads corresponding with the threads *c c* cut on the outer ends of the sleeve B externally. D D are the annular glands; E E, lead or soft-metal packing contained in an annular space around the pipe formed by reaming out each end of the sleeve B larger than the diameter of the internally-threaded portion.

The coupling is used as follows: The lead or soft-metal ring for packing is placed in the recess provided in each end of the sleeve for it and the gland inserted after it and the caps started on loosely. The pipes are then passed through the cap, gland, and lead packing, and screwed into the sleeve in the usual manner of connecting pipes. After the joint is made up in that manner as tight as is practicable, the caps or nuts are screwed up firmly, thus pressing the gland against the lead and compressing and forcing it to make a tight joint with the pipe. For the purpose of being more easily screwed up tight, the caps may be made hexagonal.

The joint is steam, gas, water, and oil tight, and the packing being metallic and of lead is but little acted upon by corrosive liquids or gases, by steam or hot water, or oil.

The joint will stand anything that the pipe will, and does not weaken the pipe when it must support itself through long distances.

The steam or liquid in the pipes, in order to escape by leakage, must pass a screw-joint and the firmly-compressed metal packing, making leakage almost impossible. Though I prefer to make this packing of metal, it may be made of asbestus or of any other suitable material.

Having now fully described my invention, what I claim, and desire to secure by Letters Patent, is—

1. A pipe-coupling consisting of a sleeve internally threaded in its central portion, the ends reamed out to receive a packing and externally threaded, in combination with annular glands adapted to fit in the enlarged bores of the sleeve, and annular flanged caps internally threaded to correspond with the threads upon the ends of the sleeve, all substantially as shown.

2. An improved pipe-joint in which the ends of the pipes are screwed into the central threaded portion of a sleeve the ends of the bore of which are enlarged to receive a packing compressed against the pipes by annular glands operated by internally-threaded annular flanged caps screwing upon the ends of the aforementioned sleeve, all substantially as shown and described.

3. A pipe-coupling consisting of the sleeve

B, provided with internal threads, $b$, and externally threaded at the ends, the bore at the ends being reamed out to receive packing E, in combination with said packing, annular
5 glands D, and annular flanged screw-caps C, all constructed substantially as shown and described.

In witness whereof I have hereunto set my hand.

ELI E. HENDRICK.

Witnesses:
GEO. H. SONNEBORN,
CHAS. L. WILLIS.